United States Patent [19]
Palermo et al.

[11] Patent Number: 6,085,073
[45] Date of Patent: Jul. 4, 2000

[54] METHOD AND SYSTEM FOR REDUCING THE SAMPLING RATE OF A SIGNAL FOR USE IN DEMODULATING HIGH MODULATION INDEX FREQUENCY MODULATED SIGNALS

[75] Inventors: Keith Charles Palermo, Gilbert; Kurt Albert Kallman, Mesa, both of Ariz.

[73] Assignee: Motorola, Inc., Schaumburg, Ill.

[21] Appl. No.: 09/033,047

[22] Filed: Mar. 2, 1998

[51] Int. Cl.⁷ ........................................................ H04B 1/16
[52] U.S. Cl. .............................. 455/205; 455/23; 375/322
[58] Field of Search .................................... 455/205, 209, 455/214, 21, 23, 226.2, 226.3, 38.3, 343; 375/322, 324, 340; 329/341, 343, 361

[56] References Cited

U.S. PATENT DOCUMENTS

| | | | |
|---|---|---|---|
| 4,361,875 | 11/1982 | Hertz et al. | 364/724 |
| 5,614,862 | 3/1997 | Sun | 329/341 |
| 5,631,969 | 5/1997 | Hanson | 381/107 |

*Primary Examiner*—Lee Nguyen
*Attorney, Agent, or Firm*—Bradley J. Botsch; Jeff D. Limon; Frank J. Bogacz

[57] ABSTRACT

A method and system for reducing the sampling rate of a signal for use with high modulation index frequency modulated signals reduces the power consumption and processing requirements of the digital signal processing equipment which performs the demodulation. In a preferred embodiment, a high modulation index FM signal is divided into in-phase and quadrature phase components by a downconverter (FIG. 1, 10). These components are sampled by analog to digital converters (20, 21) and input to a delay element (40, 41). The resulting delayed and undelayed samples are conveyed to downsamplers (60–63) where the sampling rate is reduced. The undelayed in-phase and delayed quadrature phase components are multiplied together by a first multiplier (70) while the undelayed quadrature phase and delayed in-phase components are multiplied together by a second multiplier (71). The output of the second multiplier (71) is then subtracted from the output of the first multiplier (70) by a subtractor (80) which outputs baseband audio or data.

10 Claims, 2 Drawing Sheets

METHOD AND SYSTEM FOR REDUCING THE SAMPLING RATE OF A SIGNAL FOR USE IN DEMODULATING HIGH MODULATION INDEX FREQUENCY MODULATED SIGNALS

STATEMENT OF GOVERNMENT RIGHTS

This invention was made with government support under Contract No. F30602-95-C-0026 awarded by the U.S. Air Force. The Government has certain rights in this invention.

FIELD OF THE INVENTION

The invention relates generally to frequency modulation (FM) communications and, more particularly, to methods of implementing digital signal processors for use in receivers of high modulation index FM signals.

BACKGROUND OF THE INVENTION

Communications using frequency modulated signals have been in existence since the early years of radio communications. In a frequency modulated system, information is modulated in a frequency domain and placed on a carrier for transmission to at least one receiver. In commercial broadcast FM transmission, the transmitted signal bandwidth is quite large relative to the modulation bandwidth because a high modulation index is used. For example, in conventional FM broadcast communications the transmitted signal bandwidth used is on the order of 200 kilohertz, while the modulation bandwidth is only 25 or 30 kilohertz. This large disparity between signal bandwidth and modulation bandwidth is desirable in commercial applications since it increases the signal to noise ratio at the receiver at the expense of frequency use efficiency as well as transmitter station complexity. This enables the inexpensive production of portable FM receivers which have high audio reproduction capability.

As digital electronics continue to decrease in cost, it has become desirable to utilize digital electronics in applications previously performed only by analog electronics. This is especially true in the area of radio communications including commercial FM broadcast receivers. However, given the large modulation index used in commercial FM broadcast equipment, a digital signal processor designed to operate in a high modulation index FM environment must perform mathematical manipulations on sampled versions of a received signal at a rate equal to or greater than two times the signal bandwidth. Thus, when used for signal processing of conventional high (200 kilohertz) FM signals, this necessitates that the signal processor perform mathematical manipulations on signal components sampled at a rate equal to or greater than 400 kilosamples per second or 200 kilosamples per second in a quadrature baseband configuration. Even with digital electronics decreasing in cost, it is still problematic to use digital signal processors that operate at this speed. Such high speed digital signal processors have the disadvantages of consuming comparatively large amounts of power, as well as being difficult to build. These factors have a significant impact on the ability to build portable FM communications receivers based on digital signal processing technology. Therefore, what is needed are a method and system for reducing the power consumption and complexity of digitally implemented FM broadcast receivers, without significantly degrading the audio reproduction capability of the FM receiver.

DESCRIPTION OF THE PREFERRED EMBODIMENTS

A method and system for reducing the sampling rate of a signal for use with high modulation index frequency modulated signals enables portable FM receivers to be built using low cost signal processing components which consume only small amounts of power. Additionally, the method and system provide the capability for adjusting the rate at which the digital signal processors of a portable FM receiver operate in order to extend battery life with only a modest decrease in audio reproduction capability.

Figure 1:
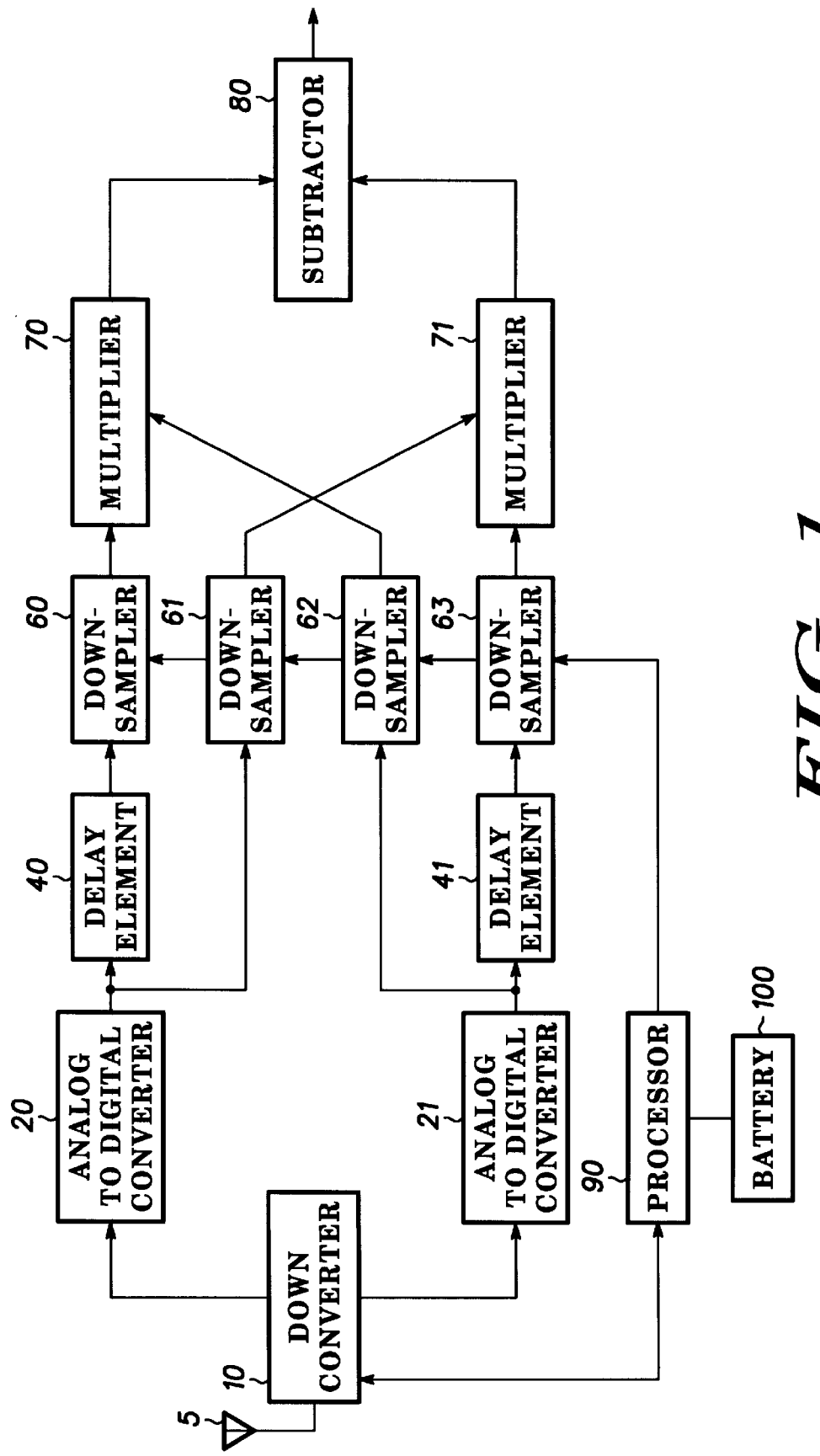
FIG. 1 illustrates a system for reducing the sampling rate of a signal for use with high modulation index frequency modulated signals in accordance with a preferred embodiment of the invention.

FIG. 1 illustrates a system for reducing the sampling rate of a signal for use with high modulation index frequency modulated signals in accordance with a preferred embodiment of the invention. In FIG. 1, a high modulation index frequency modulated signal is first incident on antenna 5. The high modulation index frequency modulated signal may contain audio, voice, or data as required by the particular application. Antenna 5 is desirably constructed of a conductive material suitable for use at the carrier frequency of the modulated signal. Antenna 5 is coupled to downconverter 10 through any number of appropriate connections suitable for use at radio frequencies.

Downconverter 10 produces both in-phase and quadrature phase components of the signal. Downconverter 10 can contain an analog mixer and quadrature delay element which produces the in-phase and quadrature phase components of the signal. Downconverter 10 can also incorporate other techniques which provide in-phase and quadrature phase components of the received signal. In a preferred embodiment, the in-phase and quadrature phase components of the signal are output from downconverter 10 through separate output ports.

The in-phase component of the signal is then incident on first analog to digital converter 20. Additionally, the quadrature phase component of the signal is incident on second analog to digital converter 21. Analog to digital converters 20 and 21 can be of any type known to those of skill in the art. It is desirable that analog to digital converters 20 and 21 possess sufficient resolution so as to minimize the quantization noise which results from the analog to digital conversion process. It is also desirable that analog to digital converters 20 and 21 possess sufficient dynamic range so as to allow signals of varying strength to be sampled. In a preferred embodiment, analog to digital converters 20 and 21 operate at a sampling rate commensurate with the bandwidth of the received signal. For use with conventional high modulation index (200 kilohertz bandwidth) FM signals in a baseband sampling configuration, analog to digital converters 20 and 21 operate at a rate of at least 200 kilosamples per second.

At the output of analog to digital converter 20, the sampled in-phase component is then input to delay element 40. Additionally, at the output of analog to digital converter 21, the sampled quadrature phase component is then input to delay element 41. Delay elements 40 and 41 serve to introduce a delay equal to the reciprocal of the frequency at which analog to digital converters 20 and 21 operate. In this manner, delay elements 40 and 41 introduce a delay of a single sampling period in both the in-phase and quadrature phase components.

The delayed in-phase output of delay element 40 is then input to downsampler 60. Additionally, the in-phase, undelayed, output of analog to digital converter 20 is input to downsampler 61. Similarly, the delayed quadrature phase output of delay element 41 is input to downsampler 63, while the undelayed quadrature output of analog to digital converter 21 is input to downsampler 62.

Downsamplers 60–63 serve to reduce the rate at which the sampled in-phase and quadrature phase components from analog to digital converter 20 and from delay elements 40 reach multipliers 70 and 71. In a preferred embodiment, the reduction factor applied by downsamplers 60–63 to the sampled in-phase and quadrature phase components is selectable in multiples of two. As an example, when used in a receiver for conventional 200 kilohertz broadcast FM, the baseband sampling rate from analog to digital converters such as 20 and 21 would preferably be at least 200 kilosamples per second. Thus, in a preferred embodiment, downsamplers 60–63 can decrease the sampling rate from 200 kilosamples per second to 100 kilosamples per second by discarding every other sample. In the event that the sample rate is to be reduced by a factor of four, three of every four samples would be discarded. The downsampling factor could continue to be increased by a factor of two until the Nyquist limit of the modulation bandwidth is reached. Thus, in this example, if the two-sided modulation bandwidth of the received signal is 25 kilohertz, it is not desirable for downsamplers 60–63 to reduce the sampling rate to less than 25 kilosamples per second.

The importance of downsamplers 60 through 63 is their capability to reduce the number of symbol multiplications performed by multipliers 70 and 71, and the number of subtractions performed by subtractor 80. In many digital applications, multipliers such as 70 and 71 and subtractors such as subtractor 80, consume a proportionally large amount of power and are complex to design. Through the actions of downsamplers 60–63, the power consumption and required design complexity of the receiver system can be drastically reduced. In a preferred embodiment of the invention, downsamplers 60–63 are controlled through processor 90. Processor 90 can also measure the voltage or other parameter of battery 100 through an appropriate sensor. Additionally, processor 90 can also perform signal quality measurements, such as received signal to noise ratio, on the incoming high modulation index frequency modulated signal from antenna 5.

It is recognized that the effect of downsampling can negatively impact the audio reproduction capability of the receiver as will be discussed later with reference to FIG. 3. When a received wideband signal possesses a low signal to noise ratio, it can be advantageous to perform no downsampling and, therefore, not further degrade the audio reproduction capability. However, in those cases where audio reproduction quality is not an issue, such as when the user is interested in the informational content of the high modulation index frequency modulated signal, it can be useful to downsample significantly in order to reduce the power consumption of the receiver.

The output of downsampler 60, a downsampled delayed in-phase component, is then multiplied by output of downsampler 62, a downsampled quadrature phase component, using multiplier 70 which results in an in-phase product. Additionally, the output of downsampler 61, a downsampled in-phase component, is multiplied by the output of downsampler 63, a downsampled delayed quadrature phase component, using multiplier 71 resulting in a quadrature phase product. The quadrature phase product is then subtracted from the in-phase product using subtractor 80. In a preferred embodiment, the resulting sum from subtractor 80 then represents demodulated information such as baseband audio, voice or baseband data.

Figure 2:
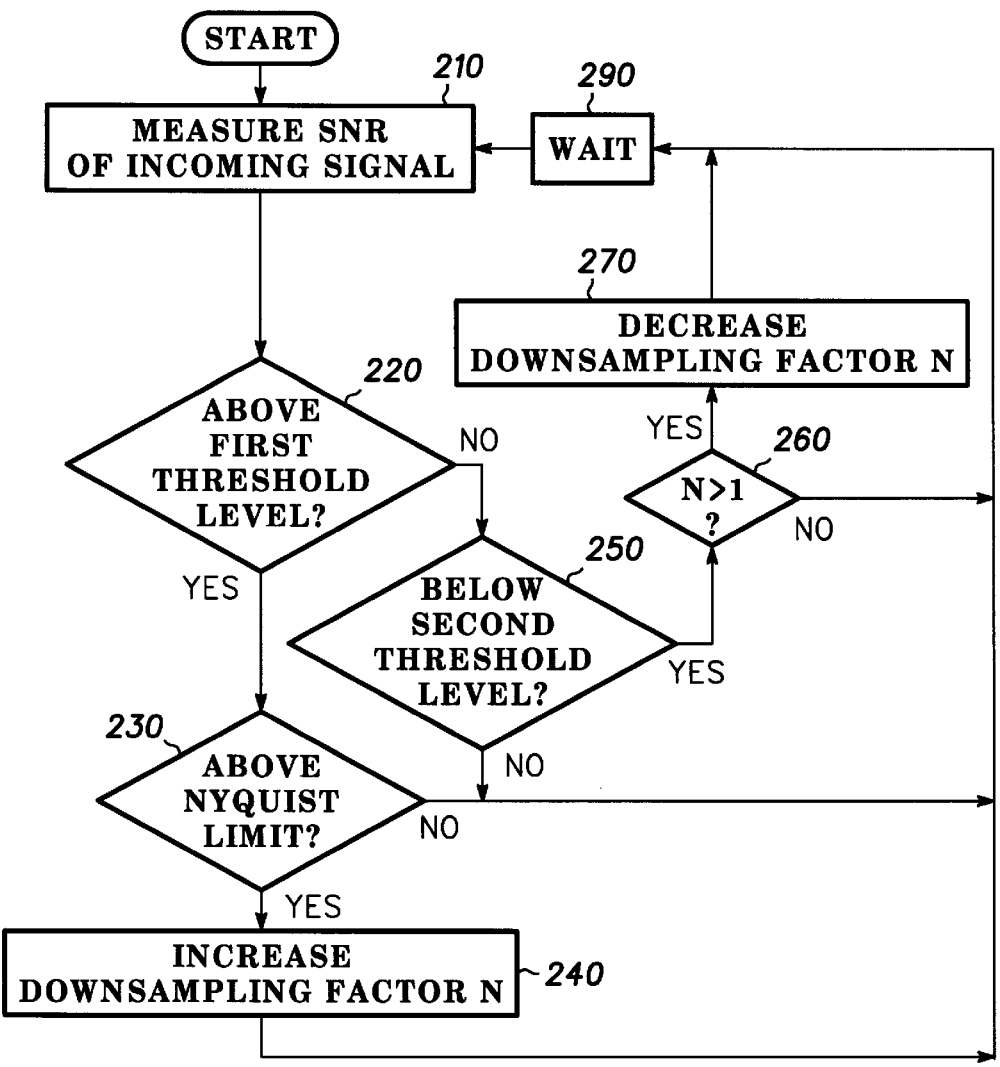
FIG. 2 illustrates a method for selection of a down sampling factor in accordance with a preferred embodiment of the invention.

FIG. 2 illustrates a method for selection of a downsampling factor in accordance with a preferred embodiment of the invention. In step 210, the signal to noise ratio of an incoming high modulation index FM signal is measured. In step 220, a processor determines whether the incoming signal possesses a signal to noise ratio is above a first predetermined or user selectable threshold value, such as 20 dB. If the signal to noise ratio of the incoming signal is above a specific threshold, then step 230 is executed. In step 230, the current sampling rate is compared with the Nyquist limit of the incoming modulated signal. If the current sampling rate is above the Nyquist limit, then step 240 is executed in which the downsampling factor, N, is increased. If the comparison of step 230 indicates that the current sampling rate is not above or is too close to the Nyquist limit, then the process returns to step 210.

If the comparison of step 220 determines that the incoming signal is not above a predetermined threshold value, then step 250 is executed. In step 250, the processor determines if the incoming signal is below a predetermined second threshold value. If the evaluation of step 250 indicates that the signal is below the second threshold value, then step 260 is executed. In step 260, the current sampling rate is evaluated and decreased in step 270 if the downsampling factor is greater than one (N>1). The process then returns to step 210 after waiting a period of time, as in step 290. If the current downsampling factor is not greater than one (N=1) then the process returns to step 210 after waiting a period of time, as in step 290.

The use of this method allows the receiver to periodically adjust the downsampling rate to optimize for performance when the strength of the received signal varies as a function of time. Additionally, the receiver preferably does not reduce the sampling rate to a value lower than the Nyquist limit of the modulation bandwidth. Thus, a receiver can quickly adjust the downsampling factor in order to minimize the power consumed by the receiver's digital signal processing electronics.

Figure 3:
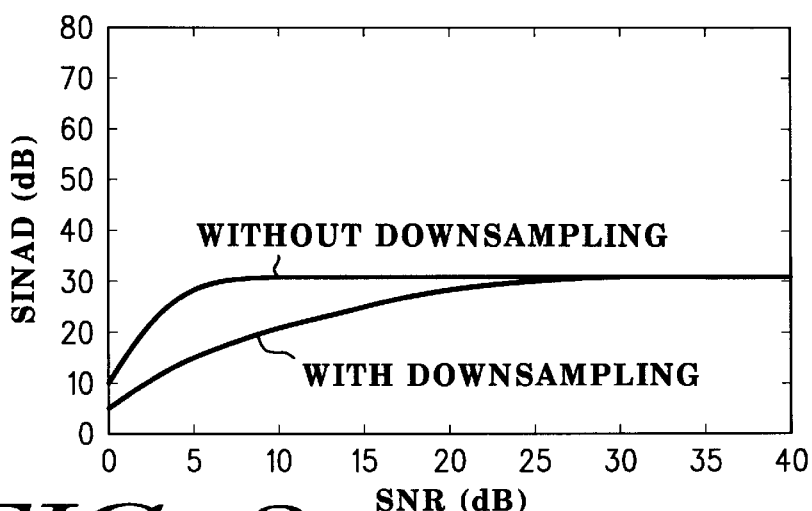
FIG. 3 provides a graph which illustrates the relationship between output SINAD, and input signal to noise ratio for a down sampling factor of eight in accordance with a preferred embodiment of the invention.

FIG. 3 provides a graph illustrating the relationship between output SINAD and input signal to noise ratio for a downsampling factor of eight in accordance with a preferred embodiment of the invention. The vertical axis of FIG. 3 provides the measure of SINAD. As known to those skilled in the art, SINAD is used as a measure of audio quality. SINAD is useful in providing a composite measurement of audio response as a function of both signal to noise ratio of the received signal, as well as any distortion introduced by the receiver electronics such as quantization noise resulting from an analog to digital conversion process or distortion by a speaker or other electro-acoustic device.

The horizontal axis of FIG. 3 provides a measure of the input signal-to-noise ratio of the high modulation index FM signal. From the graph of FIG. 3, it can be seen that a downsampling technique in accordance with a preferred embodiment of the invention does result in a decrease in audio performance (SINAD) of the receiver when the signal to noise ratio of the received signal is lower than roughly 20 dB. For the case of FIG. 3, a downsampling factor of eight has been used to illustrate the modest performance degradation which results from downsampling a high modulation index FM signal. It can be appreciated that in the event that a greater degree of downsampling is used, such as sixteen, a greater performance degradation in SINAD can be expected while power consumption is correspondingly reduced. Similarly, a lesser amount of downsampling, such as four or two, would result in a lesser degradation of audio quality but an increase in power consumption.

A method and system for reducing the sampling rate of a signal for use with high modulation index frequency modulated signals provides the capability to reduce power consumption and minimize the complexity of the digital signal processing electronics in a broadcast or communications FM receiver. The resulting system only modestly decreases the audio response performance of the receiver when the received signal has a low signal to noise ratio. When the received signal has a high signal to noise ratio, no signal degradation is expected.

Accordingly, it is intended by the appended claims to cover all modifications of the invention that fall within the true spirit and scope of the invention.

What is claimed is:

1. A method for reducing a sampling rate of a signal for use in a communications receiver, comprising:

a) receiving an in-phase component and a quadrature phase component of a signal;

b) sampling said in-phase component and said quadrature phase component of said signal to create a sampled in-phase component and a quadrature phase component of said signal;

c) delaying said sampled in-phase component and said quadrature phase component of said signal to create a delayed in-phase component and a delayed quadrature phase component of said signal; and d) downsampling said sampled in-phase and quadrature phase components and said delayed in-phase and quadrature phase components of said signal to create a downsampled in-phase component, a downsampled quadrature phase component, a downsampled delayed in-phase component, and a downsampled delayed quadrature phase component.

2. The method recited in claim 1, wherein the method additionally comprises the steps of:

e) multiplying said downsampled delayed in-phase component with said downsampled quadrature phase component to create an in-phase product; and f) multiplying said downsampled delayed quadrature phase component with said downsampled in-phase component to create a quadrature phase product.

3. The method recited in claim 2, wherein the method additionally comprises the steps of:

g) subtracting said quadrature phase product from said in-phase product.

4. The method of claim 1 wherein said signal conveys information through frequency modulation of said signal.

5. The method of claim 4 wherein said information is baseband audio.

6. The method of claim 4 wherein said information is baseband data.

7. A system for reducing a sampling rate of a signal for use in a communication system, comprising:

a downconverter which downconverts a signal into in-phase and quadrature phase components;

an analog to digital converter which samples said in-phase and quadrature phase components of said signal to create sampled in-phase and quadrature phase components;

a delay element which delays said in-phase and quadrature phase components of said signal to create delayed sampled in-phase and quadrature phase components; and a downsampler which downsamples said sampled in-phase and quadrature phase components and said delayed in-phase and quadrature phase components of said signal to create a downsampled in-phase component, a downsampled quadrature phase component, a downsampled delayed in-phase component, and a downsampled delayed quadrature phase component.

8. The system of claim 7 wherein the system additionally comprises:

a first multiplier which multiplies said downsampled delayed in-phase component with said downsampled quadrature phase component to create an in-phase product; and a second multiplier which multiplies said downsampled delayed quadrature phase component with said downsampled in-phase component to create a quadrature phase product.

9. The system of claim 8 wherein the system additionally comprises:

a subtractor which subtracts said quadrature phase product from said in-phase product.

10. The system of claim 7, wherein the system comprises a portable FM receiver.

* * * * *